(12) United States Patent
Oelsch

(10) Patent No.: US 7,153,028 B2
(45) Date of Patent: Dec. 26, 2006

(54) HYDRODYNAMIC BEARING SYSTEM

(75) Inventor: Juergen Oelsch, Hohenroth (DE)

(73) Assignee: Minebea Co., Ltd., Nagano-ken (JP)

( * ) Notice: Subject to any disclaimer, the term of this patent is extended or adjusted under 35 U.S.C. 154(b) by 72 days.

(21) Appl. No.: 11/057,897

(22) Filed: Feb. 15, 2005

(65) Prior Publication Data
US 2005/0157963 A1    Jul. 21, 2005

(30) Foreign Application Priority Data
Feb. 17, 2004    (DE) .................... 10 2004 007 557

(51) Int. Cl.
*F16C 32/06*    (2006.01)
(52) U.S. Cl. .................. 384/100; 384/119; 384/124
(58) Field of Classification Search ................ 384/100, 384/107, 112, 114, 119, 121, 123, 124; 310/90; 360/99.08, 98.07
See application file for complete search history.

(56) References Cited

U.S. PATENT DOCUMENTS

| | | | |
|---|---|---|---|
| 5,427,456 A | 6/1995 | Hensel | |
| 5,516,212 A | 5/1996 | Titcomb | |
| 5,533,811 A | 7/1996 | Polch | |
| 5,536,088 A | 7/1996 | Cheever | |
| 6,848,830 B1 * | 2/2005 | Li .............................. 384/114 |
| 2004/0008911 A1 * | 1/2004 | Oelsch ........................ 384/100 |

FOREIGN PATENT DOCUMENTS

| | | |
|---|---|---|
| DE | 20211588 | 7/2002 |
| DE | 20218170 U1 * | 8/2003 |

* cited by examiner

*Primary Examiner*—Thomas R. Hannon
(74) *Attorney, Agent, or Firm*—Cooper & Dunham LLP

(57) ABSTRACT

The invention relates to a hydrodynamic bearing system particularly for the rotary bearing of spindle motors to drive the platters in hard disk drives which comprises at least one inner bearing part and at least one outer bearing part, the bearing parts being rotatable about a rotational axis with respect to one another. The bearing system has at least one radial bearing region and/or at least one axial bearing region which are formed on surfaces of the bearing parts facing each other. A bearing gap filled with lubricant is formed between the surfaces of the bearing parts facing each other and is connected to an equalizing volume in a fluid-conducting way.

According to the invention, the equalizing volume is formed from a single or multiple thread provided on the circumference of the outer bearing part. The outer bearing part is enclosed by a sleeve so that a winding channel acting as an equalizing volume is formed between the outer bearing part and the sleeve.

10 Claims, 7 Drawing Sheets

HYDRODYNAMIC BEARING SYSTEM

BACKGROUND OF THE INVENTION

The invention relates to a hydrodynamic bearing system particularly for the rotary bearing of a spindle motor to drive the platters in a hard disk drive according to the characteristics outlined in the preamble to patent claim 1.

OUTLINE OF THE PRIOR ART

In a hydrodynamic bearing, an internal bearing part, preferably a cylindrical shaft, is rotatably supported within a bore in an outer bearing part. Here, the inside diameter of the bearing bore is slightly larger than the outside diameter of the shaft thus creating a thin gap between the sleeve surfaces of the bore and the shaft, the gap being filled with a lubricant, preferably oil. In many cases, the bearing sleeve is held in a bearing receiving portion.

In order to build up hydrodynamic pressure in the bearing gap, at least one of the bearing surfaces is provided with a surface structure. Due to the relative rotary movement between the sleeve and bearing surfaces located opposite each other, a kind of pumping action is produced resulting in the formation of a homogeneous lubricating film of regular thickness which separates the bearing surfaces from one another and which is stabilized by means of hydrodynamic pressure zones. The advantages of this bearing principle vis-à-vis rotary bearing systems using roller bearings include low noise level, improved running precision and a significant increase in shock resistance. What is more, fewer parts are required which means that manufacturing costs can be reduced considerably.

Since any contamination of the data platters rotating within the clean-zone area of the hard disk drive inevitably results in the read/write head sticking thus leading to the total failure of the drive, it is necessary to protect the hydrodynamic bearing against bearing oil escaping or being sprayed out.

One possible means of achieving this is to use capillary seals which take advantage of the material-specific characteristics of the lubricant and the active principles behind capillary, adhesive and cohesive forces.

In one proposed solution for a capillary seal, such as in U.S. Pat. No. 5,667,309 A, the bore at one end face of the bearing sleeve has a "tapered area" taking, for example, the form of a conical counterbore, while the opposite end face is hermetically sealed. Due to its design, the retention capability of this hydrodynamic bearing with respect to the lubricant is increased, particularly when subjected at the same time to shock, which goes to improve the sealing action of the seal. Due to the counterbore in the bearing sleeve, a concentric tapered area widening outwards in the direction of the end face is formed between the sleeve inner surface and the shaft outer surface which is filled partially with bearing oil. The oil covers the surfaces of the sleeve and the shaft as a result of which a meniscus having a concave surface is formed on the contact surface to the air. The bearing oil held in the tapered area functions as a lubricant reservoir from which vaporizing oil can be replaced. The tapered area between the inner surface of the cone and the outer surface of the shaft above the meniscus acts as an equalizing volume into which the bearing oil can rise when its temperature-sensitive volume increases with a rise in temperature causing the fluid level to increase. The cohesive forces which are active in the fluid of the lubricant, supported by capillary forces in the bearing gap, prevent liquid bearing oil from escaping from the bearing and leaking into the clean-zone area. The slimmer the design of the tapered transition area and the higher the viscosity of the lubricant, the more effective is the sealing action of this arrangement.

Hydrodynamic bearing systems having capillary seals designed in a comparable way have also been revealed, for example, in U.S. Pat. Nos. 5,516,212 A, 5,427,456 A, 5,533,811 A, 5,536,088 A and DE 202 11 588 A.

One disadvantage of the known solutions for non-contact capillary seals for a hydrodynamic bearing design is the reduction in effective useful length due to the design of the tapered area being aligned axially inwards. Since the axial length and angle of inclination of the tapered area are dependent on the total filling volume and the viscosity of the lubricant, the ratio of the length of the tapered area to the length of the bearing becomes increasingly less favorable the thinner the lubricant used.

A further disadvantage lies in the fact that in the region of the equalizing volume the lubricant is directly in contact with the surrounding air. Due to the relatively large area of this contact surface, there is a risk of lubricant vaporizing and contaminating the region outside the bearing system. Moreover, when the bearing system is subjected to extreme shocks or vibrations, it may happen that lubricant is sprayed out of the equalizing volume.

SUMMARY OF THE INVENTION

It is thus the object of the invention to provide a hydrodynamic bearing system having a capillary sealing system in which
  lubricant is prevented from escaping even when the bearing system is subjected to extreme shocks or vibrations,
  the contact surface between the lubricant and the surrounding air is reduced to a minimum, providing nevertheless a sufficiently large equalizing volume,
  filling the bearing system with lubricant is made easier.

This object has been achieved according to the invention by a hydrodynamic bearing system according to the independent patent claim 1.

Beneficial embodiments and characteristics can be derived from the subordinate patent claims.

According to the invention, a single or multiple thread is formed on the circumference of the outer bearing part which, for example, takes the form of a bearing sleeve and/or a bearing receiving portion, the outer bearing part being enclosed by a sleeve so that an equalizing volume taking the form of a winding channel is formed between the outer bearing part and the sleeve. The winding channel preferably extends over the entire length of the outer bearing part in order to provide a sufficiently large equalizing volume partially filled with lubricant. The cross-section of the winding channel can take any desired shape, but is preferably triangular.

The winding channel—starting from the end adjoining the bearing gap—is preferably filled with lubricant to at least one third of its length.

One end of this winding channel is connected either directly, or preferably via a connecting channel, to the bearing gap. Instead of a connecting channel, a connecting bore or an annular channel can be provided, allowing, at all events, a continuous lubricant film to be formed between the bearing gap and the winding channel.

The winding channel or the connecting channel preferably leads into the bearing gap in the region of the thrust bearing (thrust plate), in other words at the closed end of the bearing gap, which means that the winding channel is connected to a section of the bearing gap that is associated with the axial bearing region.

In another embodiment of the invention provision can be made for the winding channel to be connected to a section of the bearing gap associated with a radial bearing region.

The outer bearing part can consist of two parts arranged concentric to the rotational axis, for example, a bearing sleeve and a bearing receiving portion enclosing the bearing sleeve.

A reflow channel extending in an axial direction is preferably arranged within the bearing sleeve and/or the bearing receiving portion, the reflow channel connecting a section of the bearing gap associated with the radial bearing region to a section of the bearing gap associated with the axial bearing region.

The other, free end of the winding channel preferably leads into an annular recess that is arranged at one end of the bearing sleeve. The recess can take the form, for example, of an annular groove on the outer circumference of the bearing sleeve/bearing receiving portion or between the bearing sleeve/bearing receiving portion and the outer sleeve enclosing them. The channel and the bearing gap can be filled with lubricant via this "recess".

The lubricant filling level is determined in such a way that the bearing gap is fully filled with lubricant and the channel is at least partially filled, for example, to half the height of the thread. Thus, according to the invention, the contact surface between the lubricant and the surrounding air is located "inside" the channel, for example, at half the length of the channel.

The advantages of the invention are apparent. Due to the relatively small cross-section of the winding channel, the contact surface between the lubricant and the surrounding air is reduced to a minimum. However, due to the relative length of the channel, a sufficiently large equalizing volume acting as a lubricant reservoir is provided.

Since the contact surface between the lubricant and surrounding atmosphere lies within the bearing sleeve or bearing receiving portion, there is no risk that the lubricant can escape even should the bearing system be subjected to extreme shocks or vibrations.

Nonetheless, a bearing system of this kind is relatively easy to fill with lubricant via the winding channel.

Several embodiments of the bearing systems according to the invention are described below on the basis of the drawings.

DESCRIPTION OF PREFERRED
EMBODIMENTS OF THE INVENTION

Figure 1:
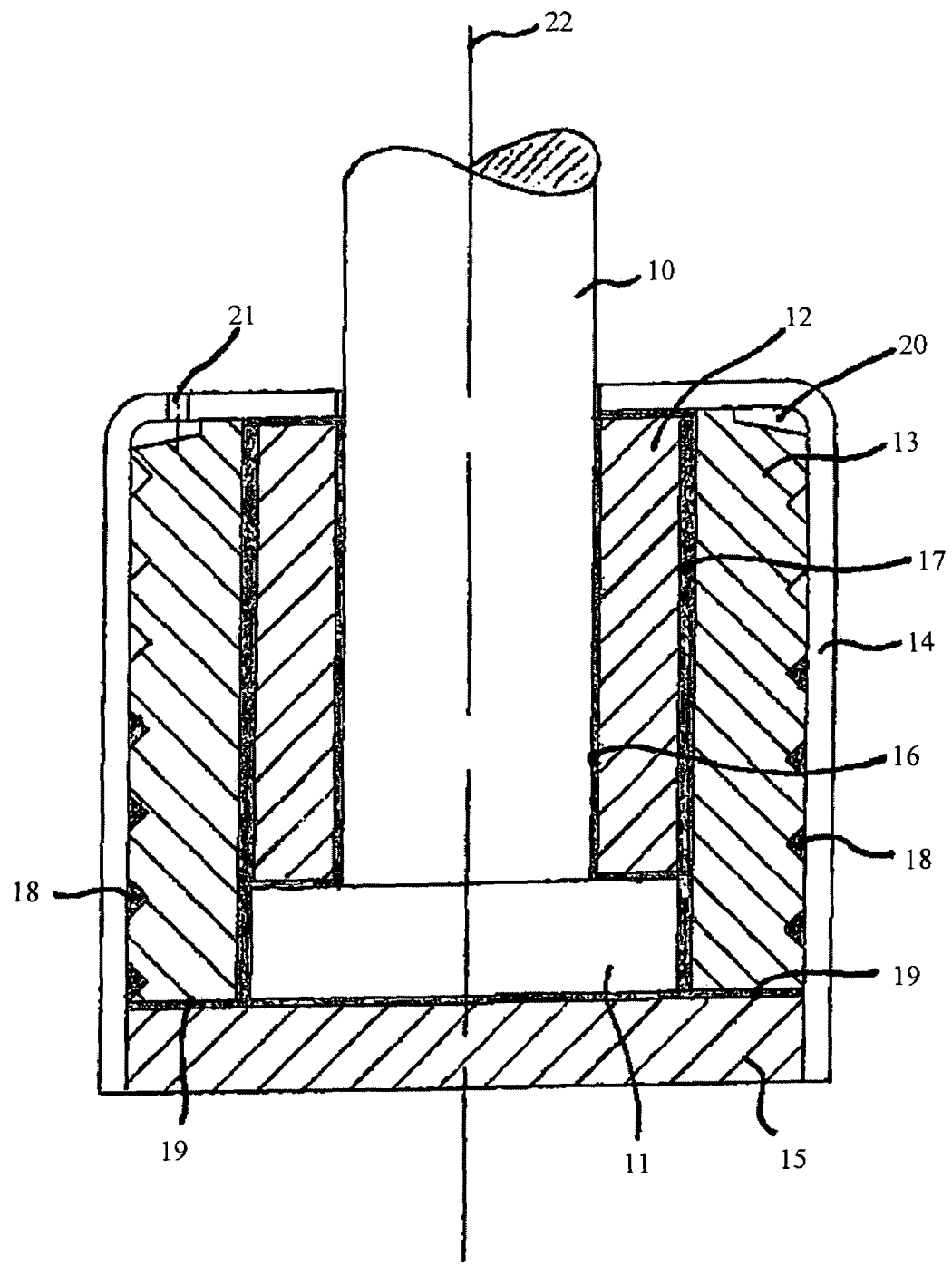
FIG. 1 shows a cross-section through a first embodiment of the bearing system according to the invention.

FIG. 1 shows a first embodiment of the bearing system according to the invention. It includes a bearing sleeve 12 having a cylindrical axial bore in which a shaft 10 is accommodated so that it can rotate about its rotational axis 22. One end of the shaft 10 (the lower) is connected to a thrust plate 11, whereas the other, free end of the shaft carries, for example, a rotor (not illustrated). The bearing sleeve 12 and the thrust plate 11 have the same outside diameter and are accommodated in a cylindrical bore in a bearing receiving portion 13. Radial bearing regions having a bearing gap 16 are provided between the inside diameter of the bearing sleeve 12 and the slightly smaller outside diameter of the shaft 10, the bearing gap 16 being filled with a lubricant, preferably a liquid bearing fluid. The radial bearing regions are marked by a surface structure taking the form of groove patterns (not illustrated). As soon as the shaft 10 is set in rotation, due to the groove pattern, hydrodynamic pressure is built up in the bearing gap 16 or in the lubricant found within it making the bearing capable of supporting a load.

The thrust plate 11, together with a cover plate 15, the bearing sleeve 12 and the bearing receiving portion 13 form a hydrodynamic thrust bearing. The thrust plate provides for the axial positioning of the shaft 10 with respect to the bearing sleeve 12 or bearing receiving portion 13 of the bearing arrangement and takes up the axial load. This axial bearing region is hermetically sealed by the cover plate 15, so that no lubricant can escape from the bearing gap 16 which continues to extend between the bearing sleeve 12, the bearing receiving portion 13, the thrust plate 11 and the cover plate 15.

To ensure that sufficient hydrodynamic pressure is built up in the axial bearing, the surfaces of the bearing sleeve 12, the thrust plate 11 or the cover plate 15 facing each other are provided with surface structures (not illustrated).

The lower and upper regions of the bearing gap 16 are connected to one another by reflow channels 17, preferably several reflow channels 17, running in an axial direction between the bearing sleeve 12 and the bearing receiving portion 13. These reflow channels 17 allow a constant circulation of lubricant within the bearing gap 16.

The bearing receiving portion 13 itself is enclosed by an approximately can-shaped sleeve 14 which covers the top end face of the bearing sleeve 12 and the bearing receiving portion 13 and extends over the entire length of the bearing receiving portion 13 and accommodates the cover plate 15 at its lower end. The free end of the shaft 10 is led through an opening in the sleeve 14.

According to the invention, a multiple thread is now provided on the outside circumference of the bearing receiving portion 13 which is covered towards the outside by the sleeve 14, thus creating a threadlike channel 18 over the entire length of the bearing sleeve 13. The threadlike channel 18 is connected to the bearing gap 16 via a connecting channel 19 in the lower region. In the upper region, the threadlike channel 18 leads into an annular recess 20 which is accessible via a filling hole 21. Lubricant can be filled in through this filling hole 21 and can then be conveyed into the bearing gap 16 using suitable means. The threadlike channel 18 acts as an equalizing volume for the lubricant and is filled, for example, to half its length with lubricant.

Figure 2:
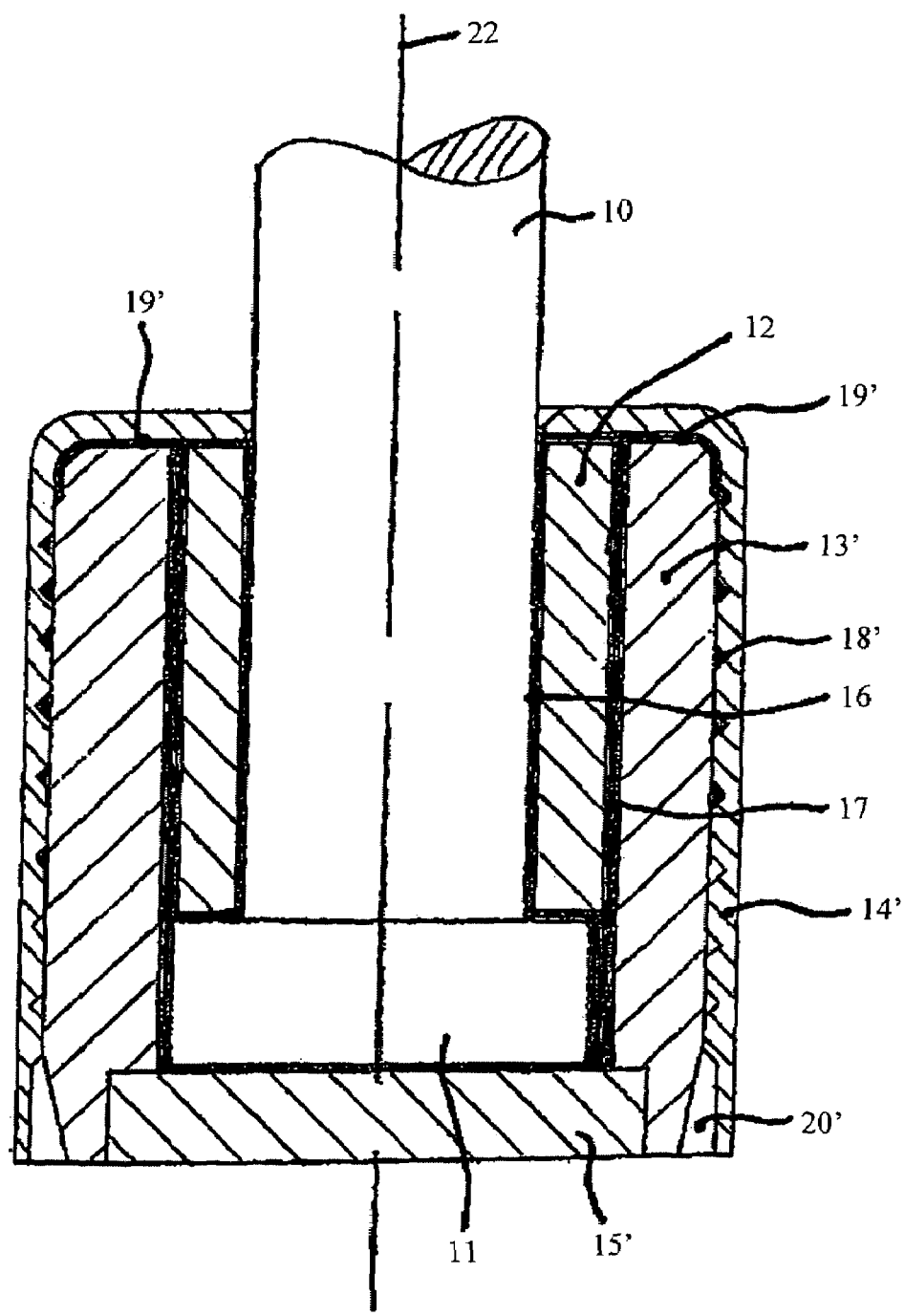
FIG. 2 shows a cross-section through a second embodiment of the bearing system according to the invention.

In a modified embodiment of a bearing system according to FIG. 2, the cover plate 15' is accommodated within a recess in the bearing receiving portion 13'. The threadlike channel 18' again extends along the outside circumference of the bearing receiving portion 13' although now it is connected in its upper region to the bearing gap 16 via a connecting channel 19'. The lower part of the threadlike channel 18' leads into a recess 20' which is annularly formed between the bearing receiving portion 13' and the sleeve 14'. The bearing system can be filled with lubricant via this recess.

Figure 3:
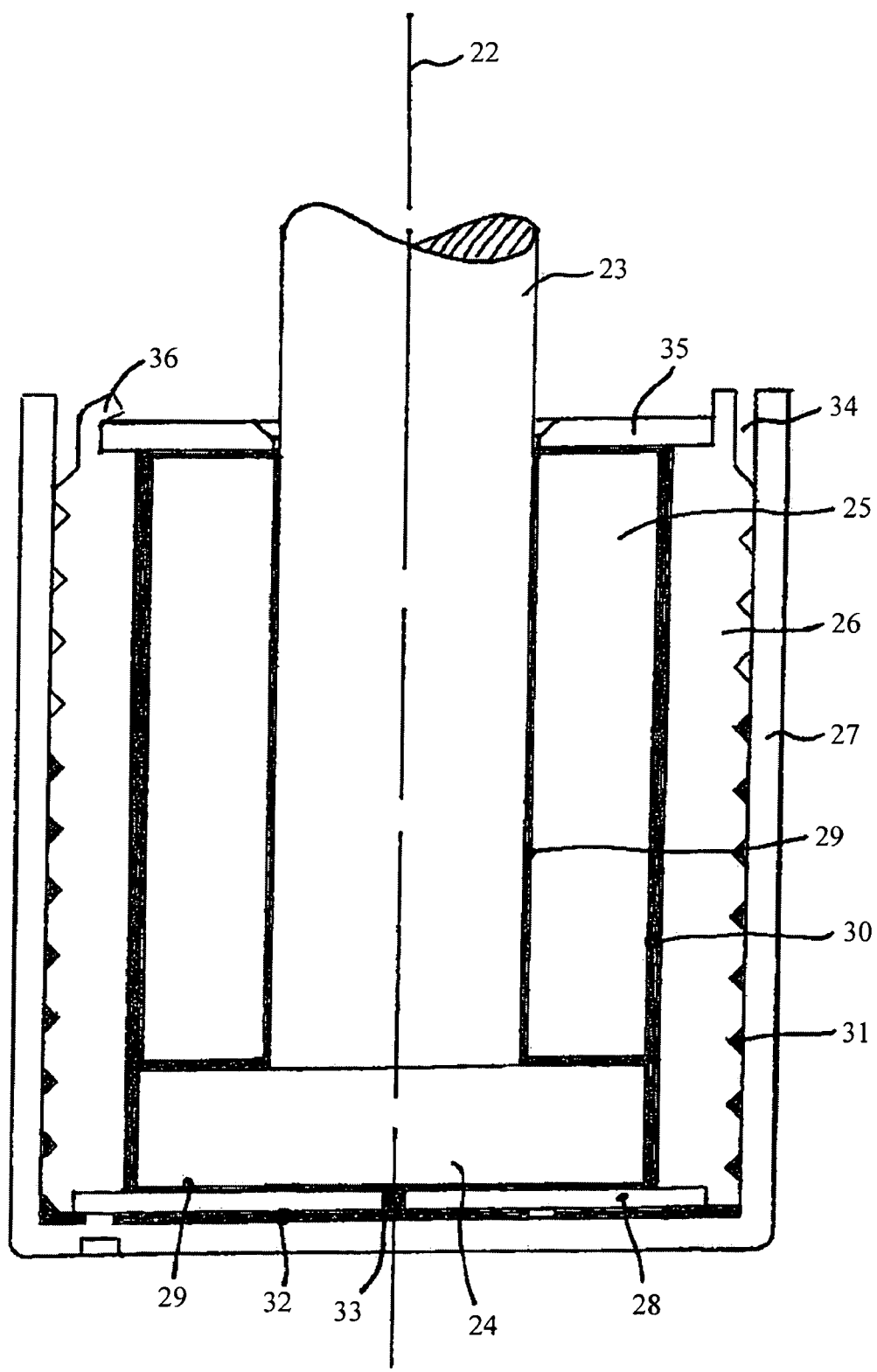
FIG. 3 shows a cross-section through a third embodiment of the bearing system according to the invention.

FIG. 3 shows an embodiment of a hydrodynamic bearing system having a thrust plate 24 disposed on the shaft 23, a bearing sleeve 25, a bearing receiving portion 26 and a cover plate 28 disposed in a recess in the bearing receiving portion 26. The bearing receiving portion 26 is enclosed by a can-shaped sleeve 27. A bearing gap 29 is again formed which has a reflow conduit 30 allowing the lubricant to circulate between the axial and radial bearing regions of the bearing gap 29. The threadlike channel 31 is located between the outside diameter of the bearing receiving portion 26 and the sleeve 27. The lower end of the threadlike channel 31 leads into a disk-shaped cavity 32 which is formed between the base of the sleeve 27 and the cover plate 28. There is preferably an opening 33 in the center of the cover plate 28 through which lubricant can flow from the cavity 32 into the bearing gap 29. The bearing arrangement can be filled with lubricant via a recess 34 connected to the upper region of the threadlike channel 31. The end faces of the bearing sleeve 25 and the bearing receiving portion 26 in part are sealed by a cover disk 35 which is fixed by means of projections 36 on the bearing receiving portion 26.

Figure 4:
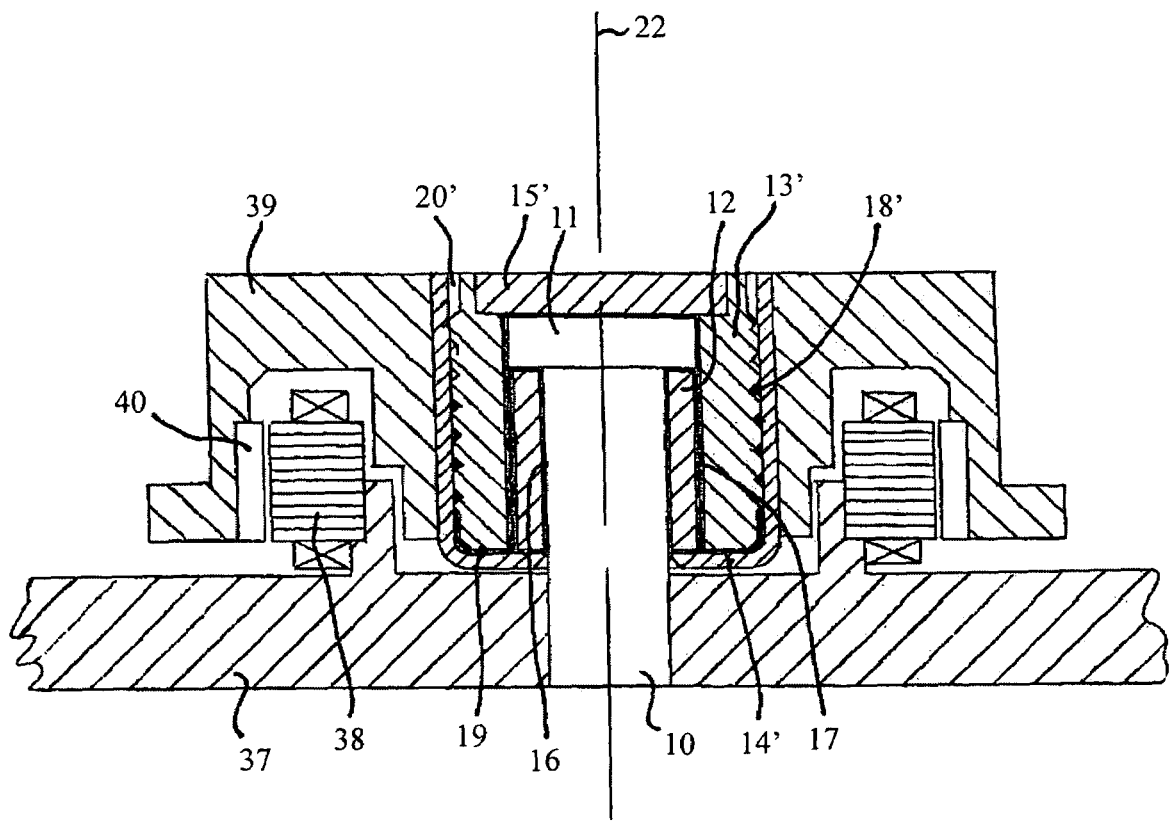
FIG. 4 shows a cross-section through a spindle motor with a stationary shaft having a bearing system designed according to FIG. 2.

FIG. 4 shows a section through a spindle motor which has a bearing arrangement according to FIG. 2. The spindle motor includes a stationary baseplate 37 on which a stator arrangement 38, comprising a stator core and windings, is arranged. The shaft 10 is accommodated in a central recess in the baseplate 37 and, together with the thrust plate 11, forms the stationary part of the bearing arrangement, while the bearing sleeve 12, bearing receiving portion 13' and the sleeve 14' together with a rotor 39 fixed to it rotate about the rotational axis 22. An annular permanent magnet 40 having a plurality of pole pairs is arranged at the lower inside edge of the rotor 39, an alternating electrical field being applied to the pole pairs by a stator arrangement 38 so that the rotor and the parts of the bearing arrangement connected to the rotor are put into rotation.

Figure 5:
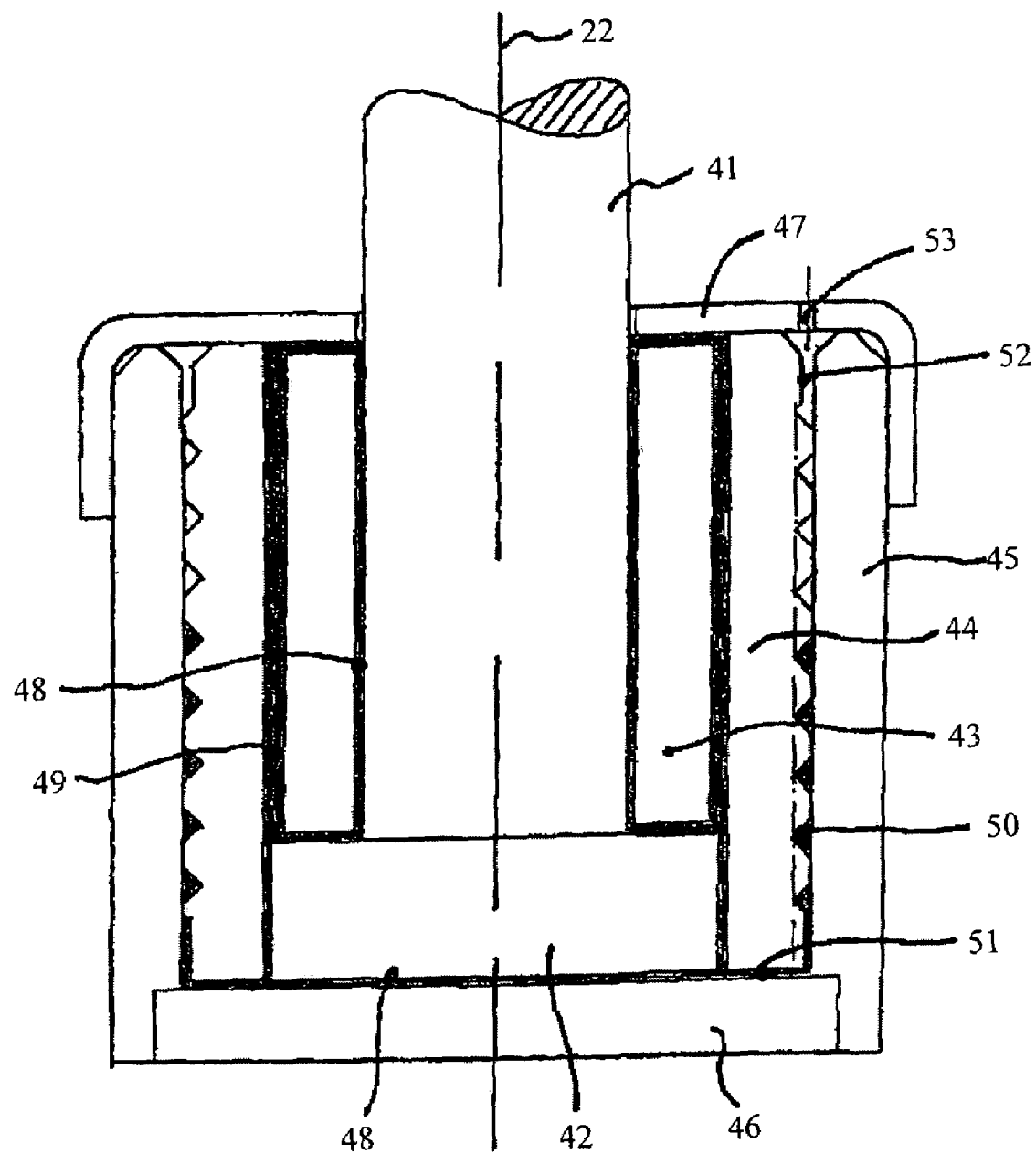
FIG. 5 shows a cross-section through a fourth embodiment of the bearing system according to the invention.

FIG. 5 shows another embodiment of a bearing system according to the invention having a shaft 41 with a thrust plate 42 disposed on the shaft 41, a bearing sleeve 43, a bearing receiving portion 44 and a sleeve 45. The underside of the bearing arrangement is sealed by a cover plate 46 accommodated in the sleeve 45. The upper region of the bearing arrangement includes a covering cap 47 which is put over the sleeve 45. The lubricant circulates between the bearing gap 48 and the reflow channel 49. A threadlike channel 50 is provided between the outside diameter of the bearing sleeve 44 and the inside diameter of the sleeve 45, the threadlike channel 50 being connected to the bearing gap 48 on the axial bearing side via a connecting channel 51. The upper region of the bearing gap 48 leads into a recess 52, it being possible to fill lubricant into the threadlike channel 50 and thus also into the bearing gap 48 and the reflow channel 49 via a filling hole 53.

Figure 6:
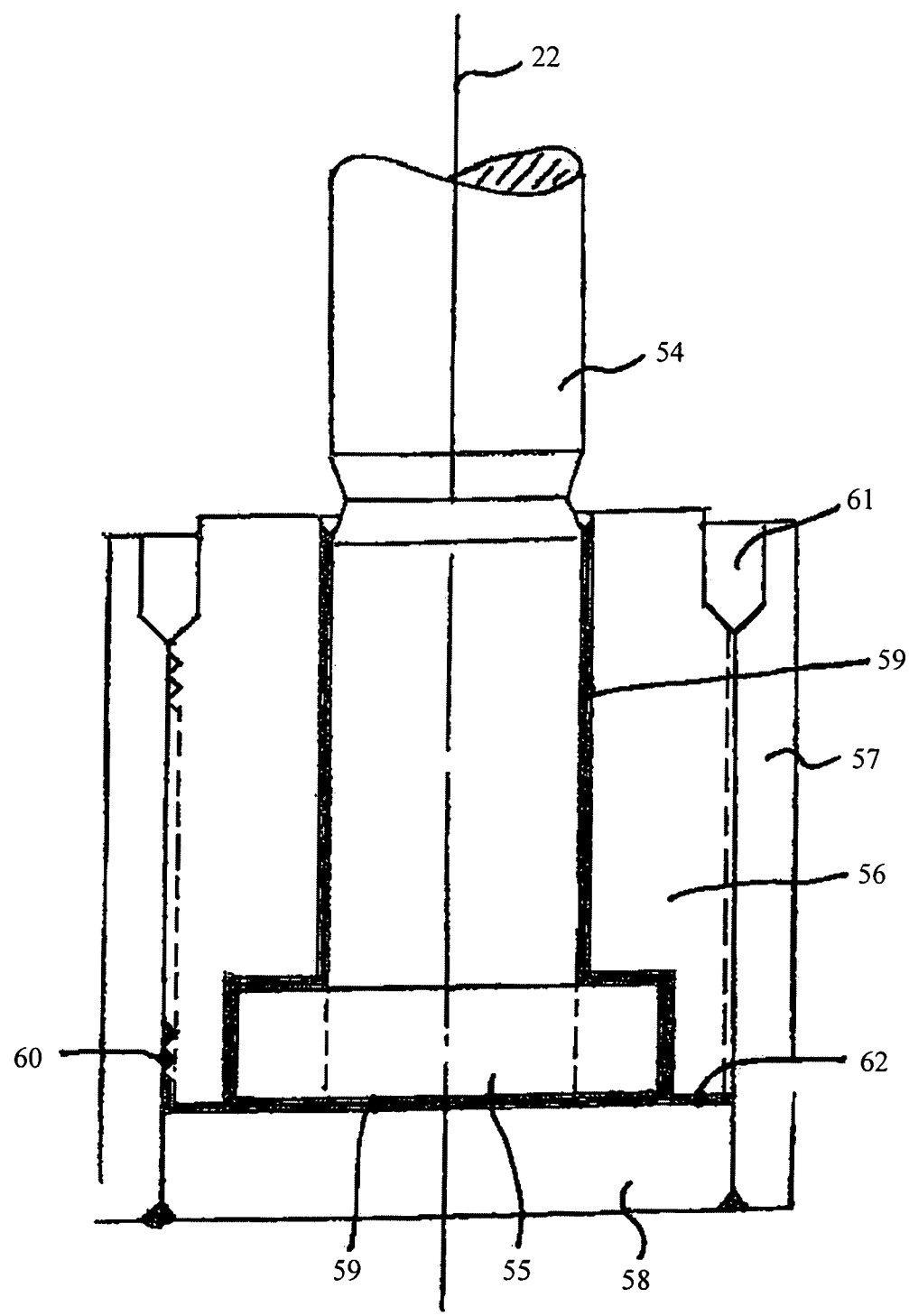
FIG. 6 shows a cross-section through a fifth embodiment of the bearing system according to the invention.

FIG. 6 shows a further embodiment of a hydrodynamic bearing system having a shaft 54 on whose lower end a thrust plate 55 is disposed. The shaft and the thrust plate are accommodated in a bearing sleeve 56 and spaced apart from the bearing sleeve 56 via a bearing gap 59. The bearing sleeve 56 is enclosed by another sleeve 57, the lower end of the bearing system being sealed by a cover plate 58 set into the sleeve 57. A threadlike channel 60 is formed between the outside circumference of the bearing sleeve 56 and the inside circumference of the sleeve 57, the threadlike channel 60 being connected to the bearing gap 59 via a connecting channel 62. The upper end of the threadlike channel 60 leads into a recess 61 through which the bearing arrangement can be filled with lubricant.

Figure 7:
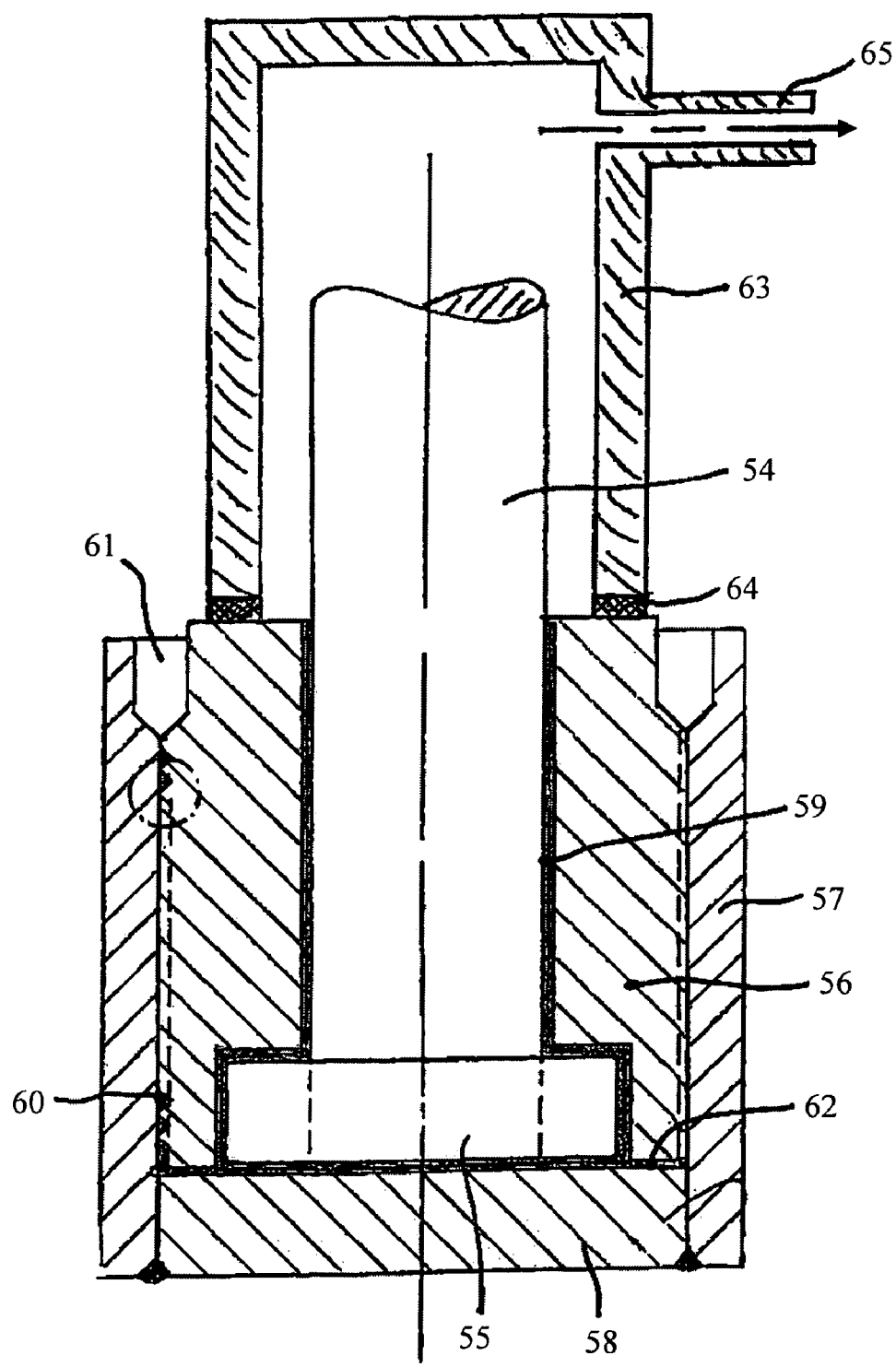
FIG. 7 shows a possible arrangement for filling the bearing system according to FIG. 6 with lubricant.

FIG. 7 shows one possible procedure for filling the bearing arrangement according to FIG. 6 with lubricant. For this purpose, a vacuum housing 63 is placed over the shaft and the bearing gap 59 located between the shaft and the bearing sleeve 56. The vacuum housing 63 has seals 64 which ensure that the housing is hermetically fitted to the end face of the bearing sleeve 56. First of all, the recess 61 is filled with the required amount of lubricant, a continuous, unbroken surface being produced having an annular, concentric, meniscus-forming contact surface to the surrounding atmosphere due to the surface tension of the lubricant. A vacuum is now created in the sealed cavity of the housing 63 via a connection 65, causing the air in the bearing and in the channel system to be sucked out and to be replaced by the lubricant flowing out of the recess 61 and through the channel system. The unbroken contact surface between the lubricant located in the recess 61 and the surrounding atmosphere prevents any air bubbles from entering into the channel system during the filling process. This goes to ensure that a continuous lubricant film can form in the bearing gap of the hydrodynamic bearing system without any air bubbles being caught in it, the lubricant film being transformed into a "fluid thread" ending in the threadlike channel 60. This method makes it possible to fill the bearing system with lubricant in a relatively simple way. Because of the comparatively long length of the threadlike channel compared to its cross-section, the quantity of lubricant to be filled is relatively uncritical, making it possible, on the one hand, to ensure that the bearing is not overfilled and, on the other hand, that there is always enough lubricant remaining in the threadlike channel to guarantee permanent lubrication over the entire useful life of the bearing.

The characteristics revealed in the above description, the claims and the figures can be important for the realization of the invention in its various embodiments both individually and in any combination whatsoever.

IDENTIFICATION REFERENCE LIST

10 Shaft
11 Thrust plate
12 Bearing sleeve
13 Bearing receiving portion 13'
14 Sleeve 14'
15 Cover plate 15'
16 Bearing gap
17 Reflow channel
18 Channel, winding 18'
19 Connecting channel 19'
20 Recess 20'
21 Filling hole
22 Rotational axis
23 Shaft
24 Thrust plate
25 Bearing sleeve
26 Bearing receiving portion
27 Sleeve
28 Cover plate
29 Bearing gap 30 Reflow channel
31 Channel, winding
32 Cavity
33 Opening
34 Recess
35 Cover disk
36 Projection
37 Baseplate
38 Stator arrangement
39 Rotor
40 Permanent magnet
41 Shaft
42 Thrust plate
43 Bearing sleeve
44 Bearing receiving portion
45 Sleeve
46 Cover plate
47 Covering cap
48 Bearing gap
49 Reflow channel
50 Channel, winding
51 Connecting channel
52 Recess
53 Filling hole
54 Shaft
55 Thrust plate
56 Bearing sleeve (receiving portion)
57 Sleeve
58 Cover plate
59 Bearing gap
60 Channel, winding
61 Recess
62 Connecting channel
63 Vacuum housing
64 Seal
65 Connection

The invention claimed is:

1. A hydrodynamic bearing system for the rotary bearing of spindle motors to drive platters in hard disk drives which comprises:
   at least one inner bearing part (10; 23; 41; 54);
   at least one outer bearing part (12,13,13'; 25,26; 43,44; 56), the bearing parts being rotatable about a rotational axis (22) with respect to one another,
   at least one radial bearing region and/or at least one axial bearing region which are formed on surfaces of the bearing parts facing each other;
   a bearing gap (16; 29; 48; 59) filled with a lubricant formed between surfaces of the bearing parts facing each other, and a fluid-conducting equalizing volume connected to the bearing gap for the lubricant,
   a single or multiple thread is formed on the circumference of the outer bearing part (12,13, 13'; 25,26; 43,44; 56), the outer bearing part being enclosed by a sleeve (14; 14'; 27; 45; 57) so that an equalizing volume taking the form of a winding channel (18; 18', 31; 50; 60) is formed between the outer bearing part and the sleeve; and
   a reflow channel (17; 30; 49) extending in an axial direction is arranged within the sleeve and/or outer bearing part (12,13,13'; 25,26; 43,44; 56) which connects a section of the bearing gap (16; 29; 48; 59) associated with the radial bearing region to a section of the bearing gap associated with the axial bearing region.

2. A hydrodynamic bearing system according to claim 1, characterized in that the winding channel (18; 18', 31; 50; 60) extends over the entire length of the outer bearing part (12,13,13'; 25,26; 43,44; 56).

3. A hydrodynamic bearing system according to claim 1, characterized in that the winding channel (18; 18', 31; 50; 60), starting from the end adjoining the bearing gap (16; 29; 48; 59), is filled with lubricant to at least a part of its length.

4. A hydrodynamic bearing system according to claim 1, characterized in that one end of the winding channel (18; 18', 31; 50; 60) is connected via a connecting channel (19; 19'; 51; 62), a connecting bore (33) and/or an annular channel (32) to the bearing gap (16; 29; 48; 59).

5. A hydrodynamic bearing system according to claim 4, characterized in that one end of the winding channel (18; 18', 31; 50; 60) leads into an approximately annular recess (20; 20'; 34; 52; 61) located in the outer bearing part (12,13,13'; 26; 44, 45; 56, 57) and/or the sleeve (14; 14'; 27; 45; 57).

6. A hydrodynamic bearing system according to claim 5, characterized in that the lubricant is filled into the bearing gap (16; 29; 48; 59) via the recess (20; 20'; 34; 52; 61), the winding channel (18; 18', 31; 50; 60) and the connecting channel.

7. A hydrodynamic bearing system according to claim 1, characterized in that the winding channel (18') is connected to a section of the bearing gap (16; 29;) that is associated with the radial bearing region.

8. A hydrodynamic bearing system according to claim 1, characterized in that the winding channel (18; 31; 50; 60)) is connected to a section of the bearing gap (; 29; 48; 59) that is associated with the axial bearing region.

9. A hydrodynamic bearing system according to claim 1, characterized in that the winding channel (18; 18', 31; 50; 60) has a cross-section which is essentially triangular in shape.

10. A hydrodynamic bearing system according to claim 1, characterized in that the outer bearing part (12,13, 13'; 25,26; 43,44; 56) consists of the sleeve and the outer bearing part concentrically enclosing the sleeve.

\* \* \* \* \*